Patented Oct. 26, 1943

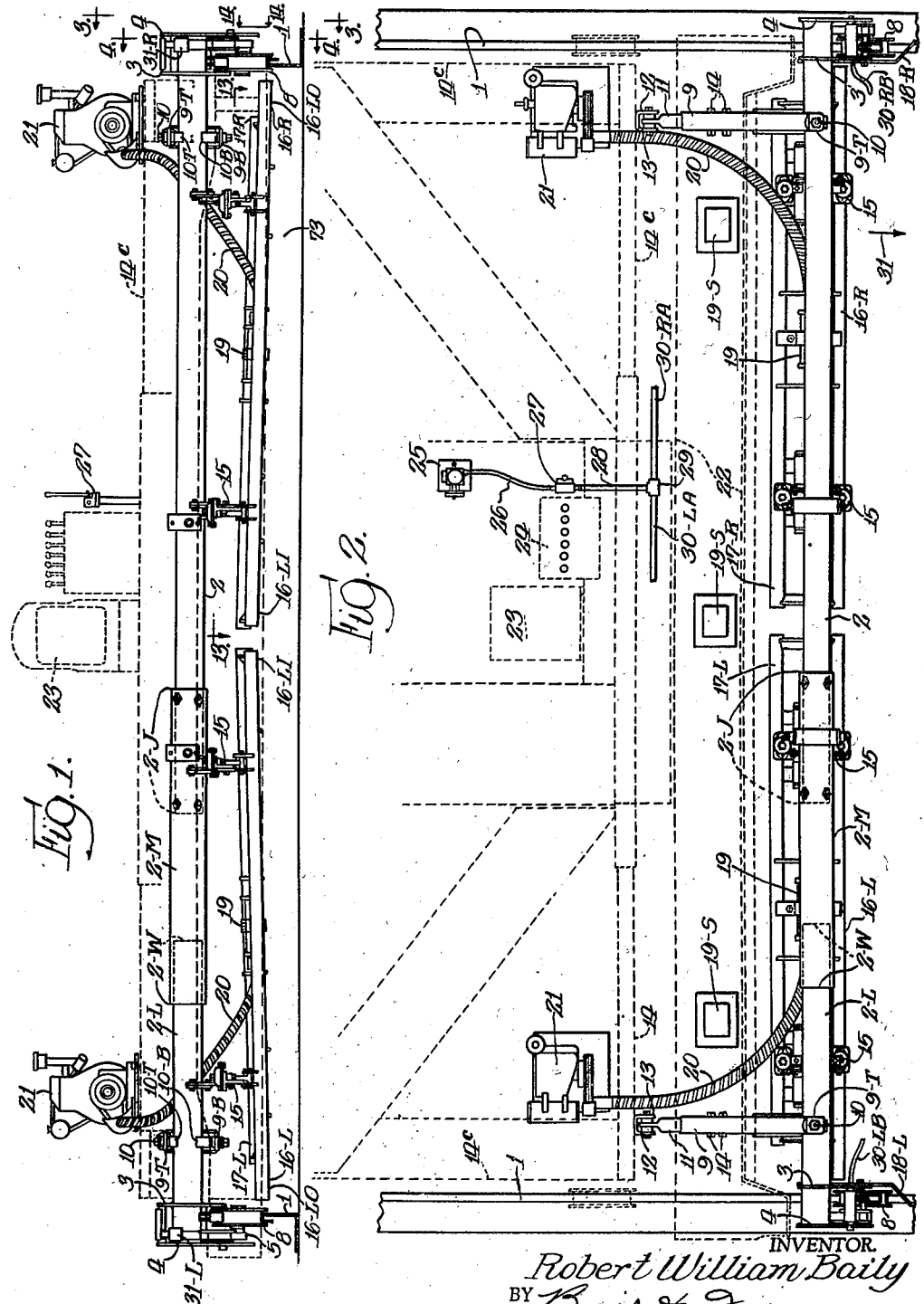

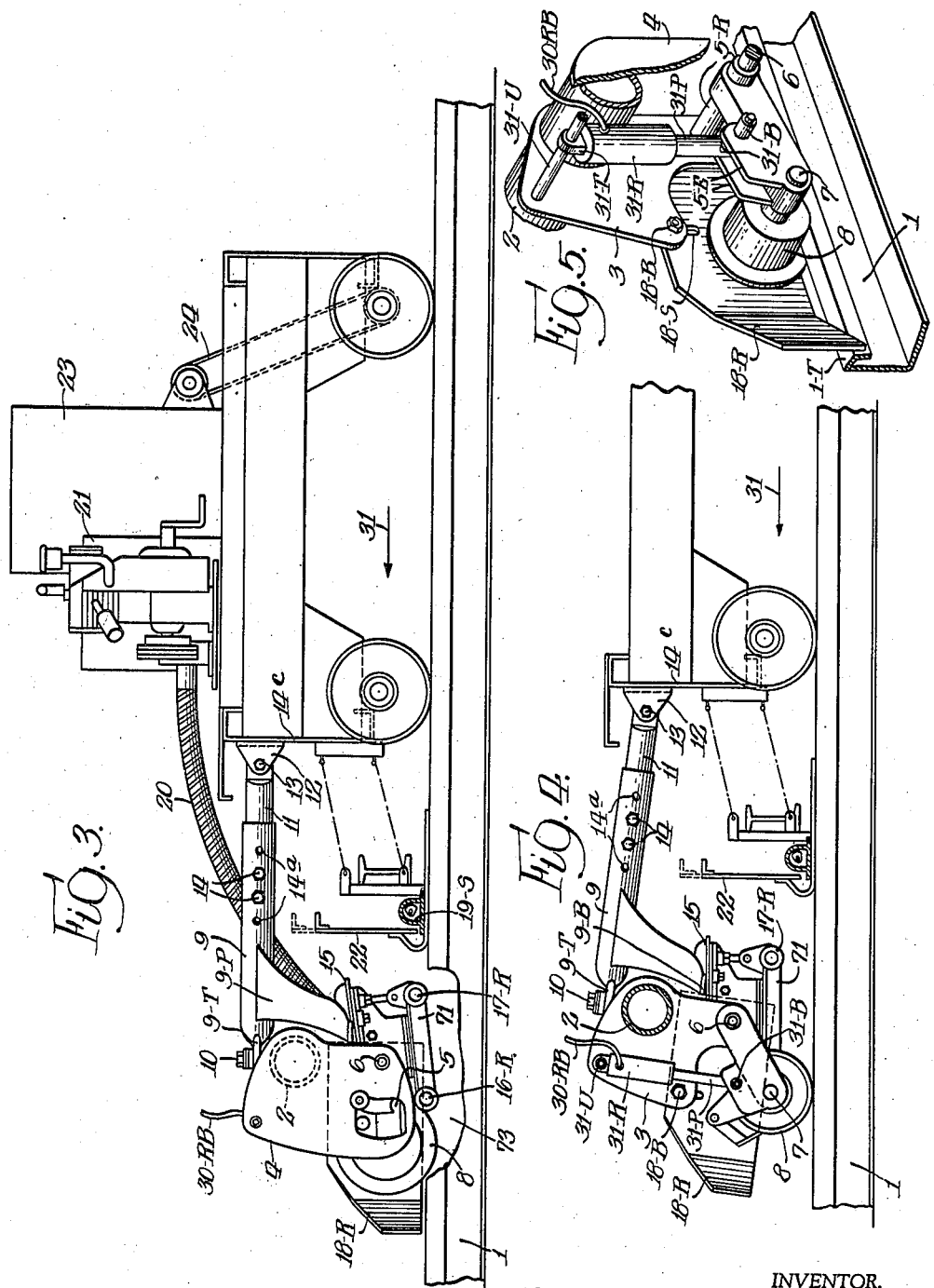

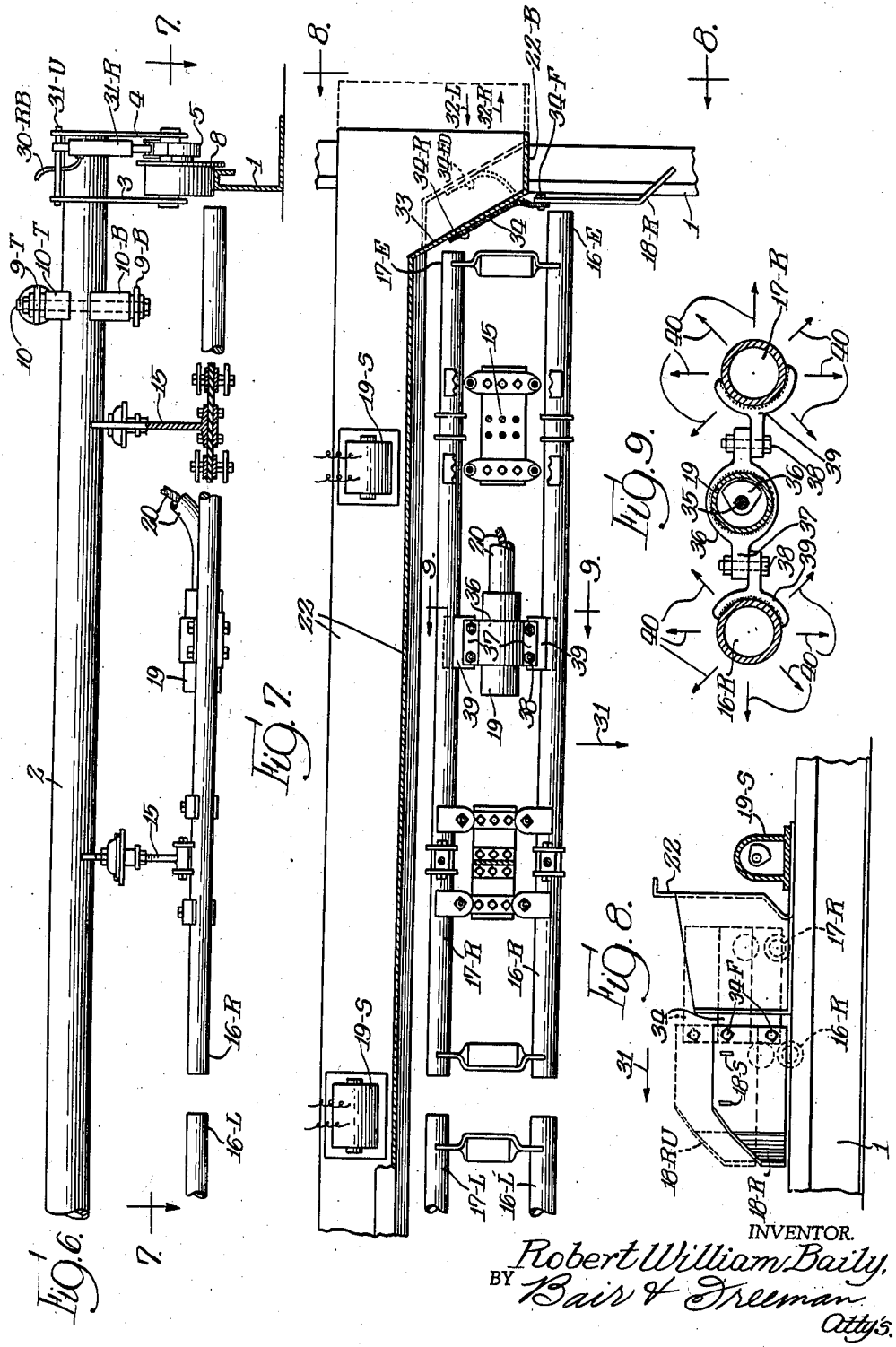

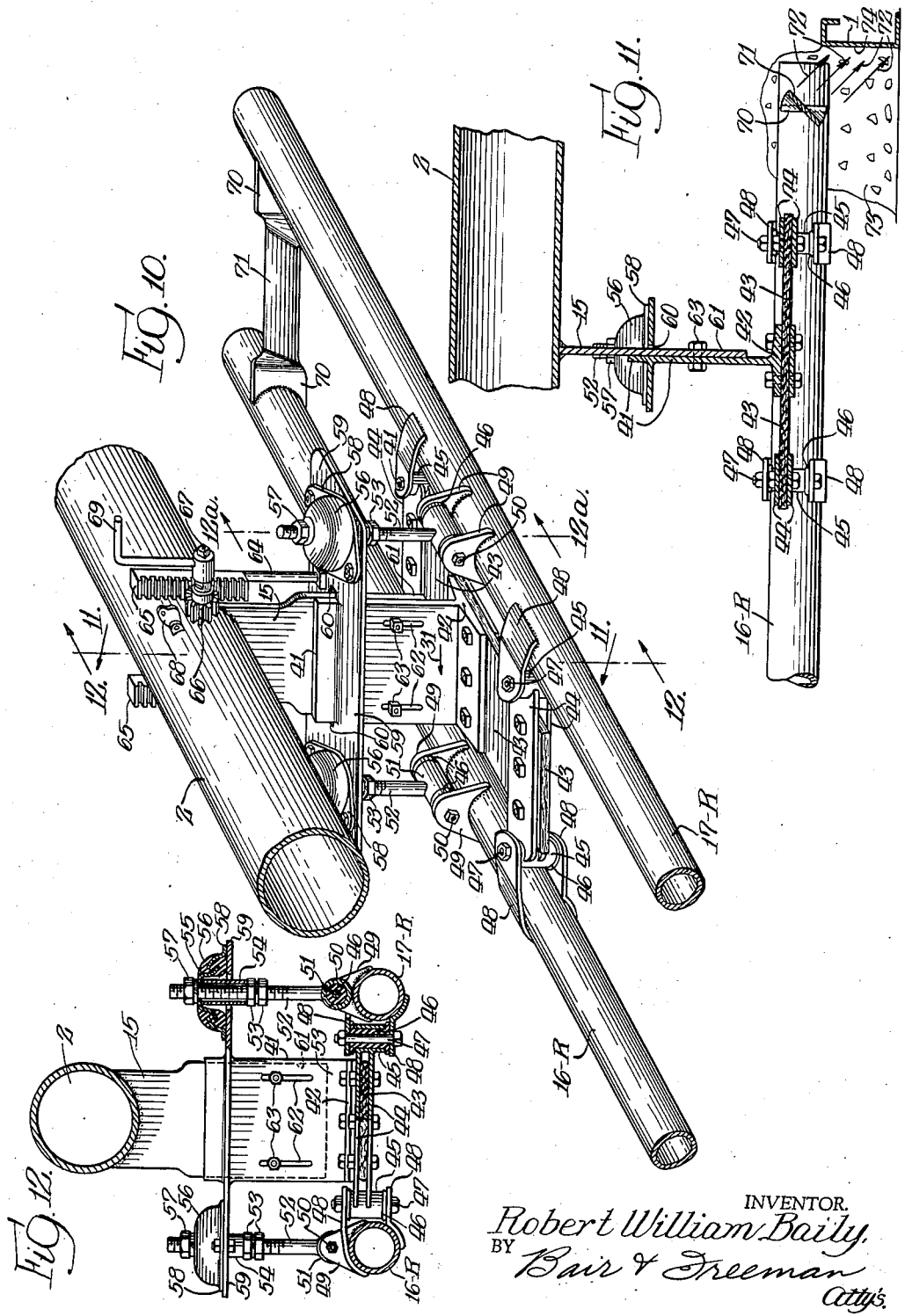

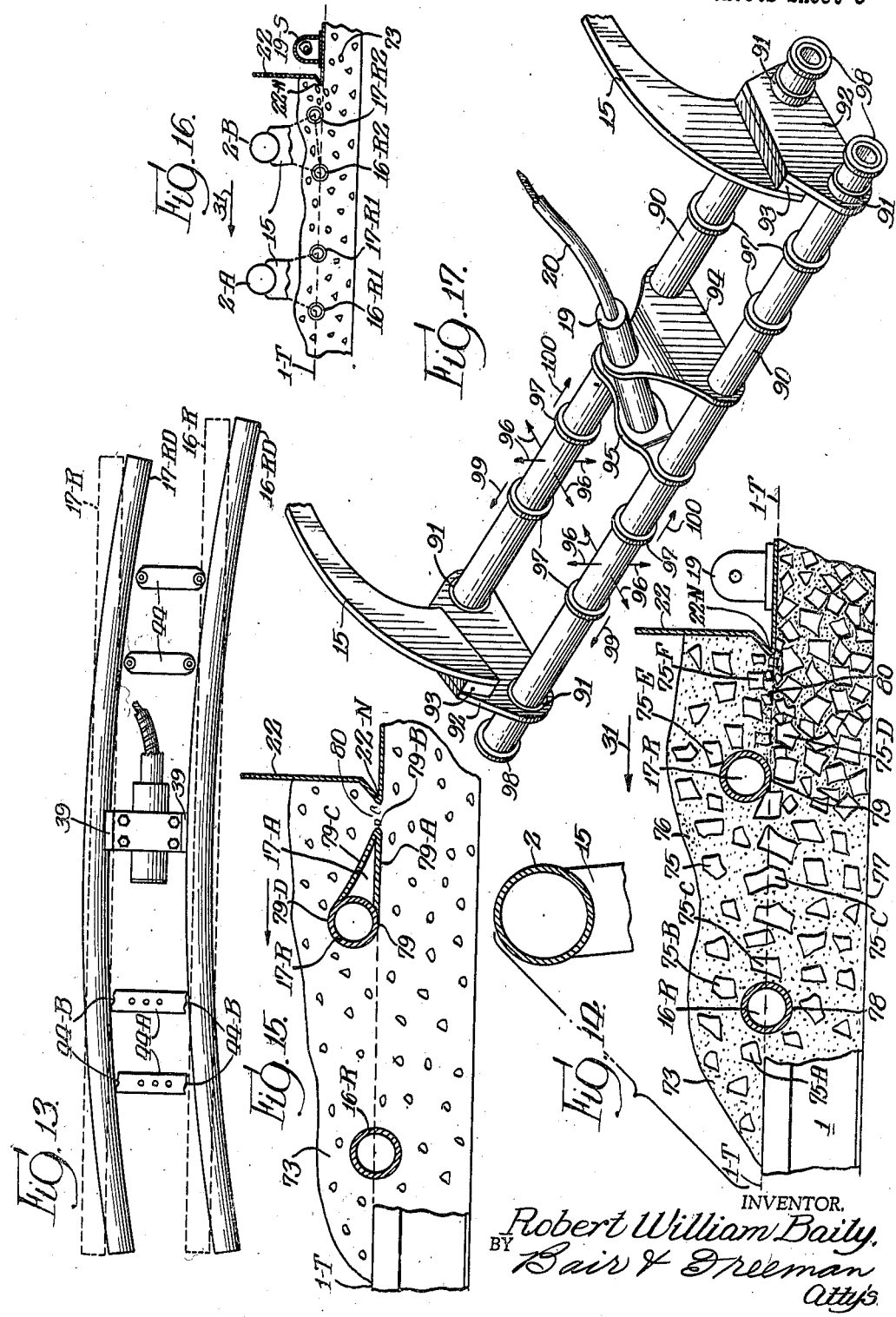

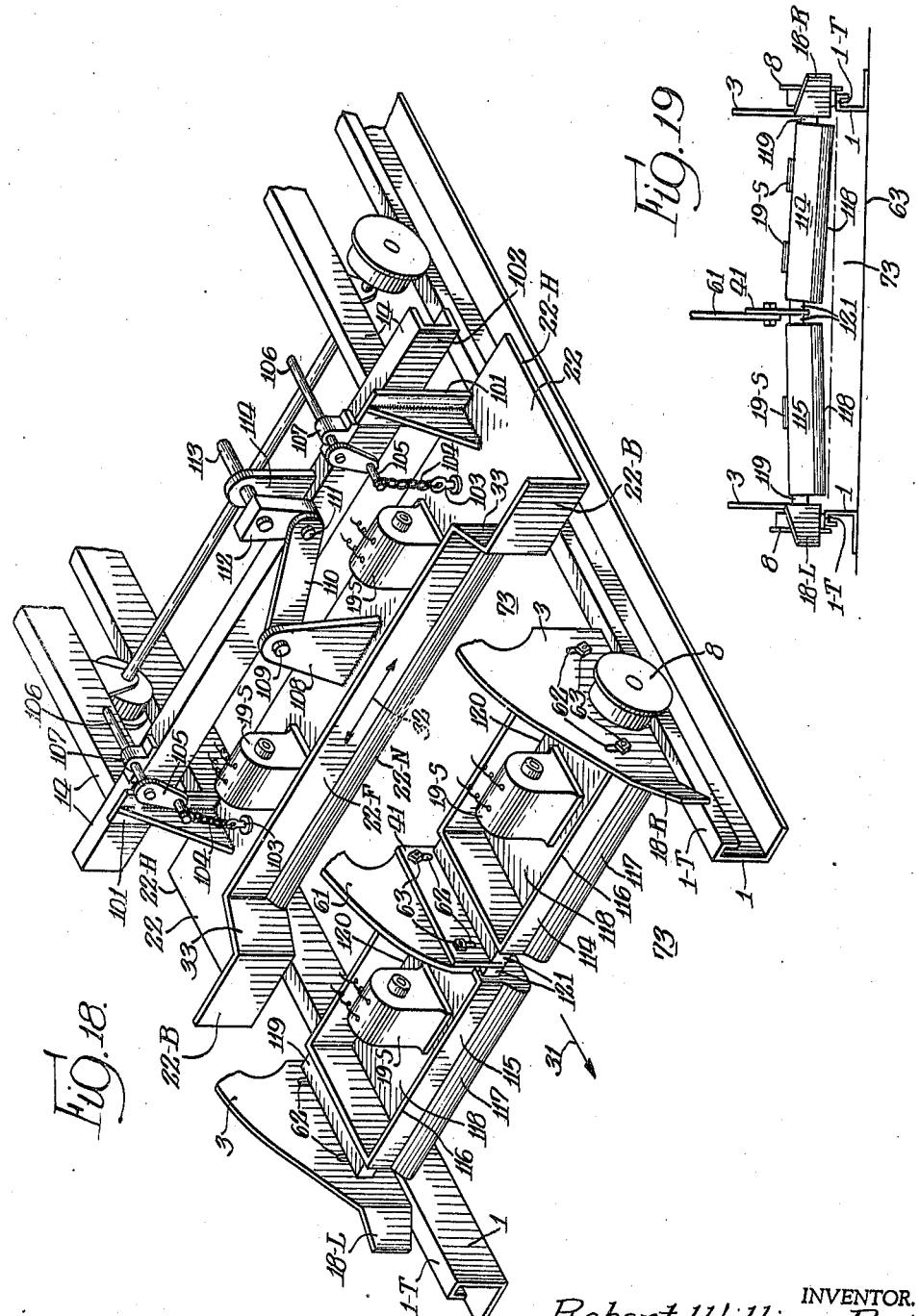

2,332,687

UNITED STATES PATENT OFFICE 2,332,687

APPARATUS FOR TREATING PLASTIC MATERIALS

Robert William Baily, Narberth, Pa.

Application December 9, 1940, Serial No. 369,299

4 Claims. (Cl. 94—48)

An object of my invention is to provide an apparatus of simple, durable and inexpensive construction for treating plastic materials by means of vibrations.

Another object is to provide an apparatus for consolidating materials, the particles of which move relatively to each other when subjected to vibration, by subjecting spaced points or areas thereof to vibrations applied internally or on the surface thereof or both, by means of one or more supporting members having one or more vibrators depending therefrom, the supporting member or members being movable to successive positions for subjecting the entire mass of material to the vibrations.

Another object is to provide an apparatus for consolidating such materials by subjecting the material to vibrations at spaced points or areas or both, and simultaneously striking off said material to a desired surface contour.

Another object is to provide an apparatus for treating a material which becomes plastic when vibrated, said material being used for pavements and other purposes, comprising the subjection of the interior of the material, or the surface thereof, or both, to vibrations imparted to the material by a plurality of vibrating mechanisms functioning at imbedded positions or at surface contact positions, or both.

Another object of my invention is to provide an apparatus for consolidating and densifying granular material, the particles of which move relatively to each other when subjected to vibrations, said materials being used for pavements or other purposes, by vibration, and simultaneously striking off the material to a desired surface contour, and also to provide a means for so disposing the larger particles of the mass into positions whereby those which were formerly in positions intersecting the plane of the desired surface contour prior to striking off, are located either above or below said plane, so that as the striking off occurs, none or few of said larger particles are so located that they intersect the plane of separation of the material lying above the desired surface contour, from the material lying below said plane.

Another object is to provide vibrating apparatus for treating a material being used for pavement or other purposes, said material being placed in an area of fixed width, which apparatus is quickly adjustable for other fixed widths.

Still another object is to provide vibrating apparatus for treating a material used for pavements or other purposes, said apparatus being arranged for quick and convenient adjustments of the various parts of the vibrating elements to give them a desired relationship to the desired finished contour of the surface of the material.

Another object of my invention is to provide one or more vibrating devices for treating such material, each comprising parallel vibratory elements generally disposed with their long axes approximately horizontal, with vibratory mechanism for actuating said vibratory elements mounted low with relation to said elements, in order that as the elements are propelled through the material, said mechanism will not laterally displace said material but will allow the material to flow over it, leaving the treated material after the passage of the elements, approximately smooth at its upper surface.

Another object is to provide elements for treating a roadway or other material by subjecting the material to vibrations, some of the components of the vibratory forces causing said vibrations acting in planes approximately parallel to the direction of travel of the apparatus, and simultaneously some components of said vibratory forces acting in directions at angles to said planes, and in directions other than parallel to the forward direction of travel of the apparatus.

Another object is so to arrange the parts of my apparatus that those parts whose axes are right lines when at rest, or in fixed curves when at rest, and which when vibrated cause said right lines or fixed curved lines to travel in paths generating surfaces out of parallel with such original lines or curves that said parts may freely assume such paths without subjecting the devices supporting said parts to undue or destructive stresses.

Another object is to provide means by which the material being subjected to vibration, and lying above the desired finished contour, may be retained and conserved between the desired lateral limits of the path of travel of the apparatus.

Another object is to provide, for supporting and propelling vibratory elements hereinbefore described, a carriage arranged to easily accommodate itself to lateral deflections of the roadway slab or other structure being constructed, and also to differences in elevation of the side forms restraining said roadway or other material where such side forms normally support the carriage, the arrangement of the carriage or supports being such that no undue strains or stresses are induced in the carriage or supports due to differences in elevation or curvature of the side forms or other supporting media.

This application is a continuation-in-part of my copending application, Serial No. 228,625, filed September 6, 1938, now Patent 2,255,344, dated September 9, 1941.

With the above and other objects in view, my present invention comprises an apparatus hereinbefore designated, whereby the objects contemplated are attained, as set forth more in detail in my specification, pointed out in my claims and illustrated in the accompanying drawings, in which:

Figure 1 is a front elevation drawing of one form of my apparatus.

Figure 2 is a top plan view of the apparatus of Figure 1.

Figure 3 is an elevation view taken on the line 3—3 of Figure 1.

Figure 4 is a partly elevation and partly sectional view taken on the line 4—4 of Figure 1.

Figure 5 is a perspective view of a part of the apparatus of Figure 1.

Figure 6 is a schematic front view of the apparatus of Figure 1 with some details of Figure 1 omitted.

Figure 7 is a schematic plan view of a part of the apparatus taken on the line 7—7 of Figure 6.

Figure 8 is a schematic and elevation view taken on the line 8—8 of Figure 7.

Figure 9 is a sectional view taken on the line 9—9 of Figure 7.

Figure 10 is a perspective view of a part of the apparatus of Figure 1.

Figure 11 is a partly sectional and partly elevation view taken on the line 11—11 of Figure 10.

Figure 12 is a partly sectional and partly elevation view taken on the lines 12—12 and 12a—12a of Figure 10.

Figure 13 is a schematic view of parts of the apparatus taken on the line 13—13 of Figure 1.

Figure 14 is a vertical sectional view of the apparatus of Figure 1 in operation, taken on the line 14—14 of Figure 1.

Figure 15 is a modified form of my invention showing a similar view to the sectional view taken on line 14—14 of Figure 1.

Figure 16 is a schematic vertical cross sectional view of another arrangement of my apparatus.

Figure 17 is a perspective view of another form of my apparatus.

Figure 18 is a perspective view of another form of my apparatus.

Figure 19 is a schematic front elevation of the apparatus of Figure 18.

In Figures 1 through 4 I show the side forms 1 of a roadway under construction. Extending across the roadway I provide the main frame member 2, shown as a tubular member, although it may be any other suitable design. At each end of the member 2 are spaced inner and outer truck plates 3 and 4, suitably attached to the member 2 (Figs. 1 and 5). Between the plates 3 and 4 the wheel yokes 5 swing on pins 6 carried by the plates 3 and 4. The yokes 5 extend forwardly from the pins 6 and at their forward ends I provide the wheel axles 7 carrying the wheels 8 which in turn roll upon the forms 1. Extending rearwardly from the frame member 2 are pusher arms 9 hinged to the frame member 2 by the vertical king pins 10 for permitting some movement of the main frame 2 parallel to its long dimension. I have shown the pusher arms 9 as tubes telescopically receiving at their rear ends the smaller tubes 11. The rear end members 11 of the pusher arms 9 are hinged to the clevises 12 by means of the horizontal clevis pins 13 which are so arranged as to permit both vertical and limited horizontal angular movement of the pusher arms 9, about the pins 13. The tubes 9 and 11 are held in desired relative positions by the spacer bolts 14, selectively extended through holes 14a, thus permitting the distance between king-pins 10 and their associated clevis pins 13 to be varied at will. Any other desired arrangements of parts may be utilized to accomplish the desired results.

The clevises 12 may be attached to any propelled carriage, such as for instance a standard roadway strike-off machine 14—C shown schematically in Figures 1 through 4.

Attached to the plates 3 are the retaining plates 18—L and 18—R (Fig. 2) to prevent the material between the side forms 1 from passing over the side forms 1 and being wasted.

Depending from the main frame 2 I provide the pusher hangers 15 (Fig. 1) shown in more detail elsewhere in this description, supporting and propelling the pairs of twin vibrating tubes 16—L and 17—L, and 16—R and 17—R (Fig. 2).

Between the twin tubes 16—L and 17—L, and also between 16—R and 17—R, I provide the vibrator mechanisms 19 described in more detail elsewhere herein, powered by the flexible shafts 20 which receive their power in turn from the prime-movers 21 which for convenience I have shown mounted on the carriage 14, although they may be carried elsewhere. Likewise, the prime movers for the vibrator mechanisms 19 may be adjacent to or integral with the mechanisms 19.

I also provide the reciprocating or non-reciprocating strike-off screed 22 on which I may mount the vibrator mechanisms 19—S. For the sake of clarity in the drawings I have omitted the mechanisms for propelling, reciprocating and elevating the screed 22.

The carriage or finishing machine 14—C is provided with its prime mover 23 for actuating the screed 22 and by means of transmission 24 propelling the carriage along the side forms 1. Likewise, the prime mover 23 may also be arranged to actuate the vibrator mechanisms 19.

I also provide the hydraulic pump 25 actuated by any convenient source of power such as a prime mover or manually, having the conduit 26, the control valve 27, and the conduit 28, leading from the valve 27 to the T or header 29. From the header 29 I provide the conduit 30—LA connecting with conduit 30—LB (Fig. 2) which in turn connects with hoisting ram 31—L (Fig. 1); likewise leading from the header 29 I provide the conduit 30—RA leading to the conduit 30—RB connected to the elevating ram 31—R (Figs. 4 and 5). This system is described in more detail elsewhere herein.

It will be noted that in Figure 3 I show the vibrating tubes 16—R and 17—R lowered to approximately the level of the tops of the side forms 1, although the lowered elevation may be selected at any other desired height. In Figure 4 I show the vibrating tubes 16—R and 17—R elevated out of engagement with the roadway material and the elevated position may be adjusted at will of the operator.

It is assumed that the direction of travel of the apparatus while vibrating the roadway material will be in the direction of the arrows 31, but this may be varied at will.

In Figure 1, I have shown the inner ends

16—LI of the tubes 16—L and 17—L elevated above the outer ends 16—LO, and likewise the inner ends 16—LI of the tubes 16—R and 17—R elevated above the outer ends 16—LO. I have assumed this position of the tubes 16—L, 17—L, 16—R and 17—R to accommodate a roadway in which the desired finished surface has a crown or upward curvature between side forms 1, but it is obvious that the tubes 16—L, 17—L, 16—R and 17—R, may be exactly level or in line end to end, or may even be depressed at the points 16—LI.

I have shown the main frame 2 constructed of two principal parts. At the left end the part 2—L extends inwardly from the plate 4 and telescopes within the larger tubular portion 2—M, the parts 2—L and 2—M being fixed to each other at points 2—W. At the right end the part 2—R extends inwardly from the plate 4 and telescopes within the part 2—M in the region 2—J. Part 2—R is free to rotate within part 2—M, but is held longitudinally within part 2—M by suitable means to maintain or adjust the distance between outer ends of parts 2—L and 2—R.

By means of the above described swivelling or rotatable connection between parts 2—L and 2—R, it is possible for ram 31—L to be in its uppermost position, as shown in Figure 3, and ram 31—R to be in its lowest position, as shown in Figure 4, without inducing any torsional stresses in the main frame member 2.

The pusher arms 9 are provided with the upper king-pin reaches 9—T, engaging the upper ends of the king-pins 10, and also with the bracket plates 9—P (Fig. 3) which continue into the lower king-pin reaches 9—B which engage the lower ends of the king-pins 10. The lugs 10—T which are welded to the top of the frame 2, and the lugs 10—B which are welded to the bottom of the frame 2, engage and carry the king-pin 10 (Fig. 1). This arrangement prevents rotation of the tube 2 and resists the torque induced by the resistance of the tubes 16—L, 17—L, 16—R and 17—R while the latter are being propelled horizontally through the road material being treated. The foregoing system, in conjunction with the free-moving connections in clevises 12, permit the wheels 8 to follow a lateral curve in the side forms 1, and in case the wheels 8 become derailed from the side forms 1, and undue stresses in the frame 2 are obviated.

Where pusher arms 9 engage the king pins 10, and where pusher arm members 11 engage the clevises 12, I provide rubber or other elastic collars or devices not only to permit freedom of movement but also to eliminate the transmission of destructive vibrations from vibrator mechanisms 19 to the carriage 14—C. Other vibration elimination devices are also included in the system as elsewhere herein described.

In Figure 5 I show the main frame 2 with the inner truck plate 3, and the outer truck plate 4 which is partly cut away to permit viewing other parts of the apparatus. The wheel yoke 5 has the integral tubular housing 5—R surrounding and rotating upon pin 6. The yoke 5 also has the upwardly extending ears 5—E which engage and carry the ram pin 31—B which in turn engages the plunger 31—P of the ram 31—R. The upper end 31—T of the ram is carried by the pin 31—U which in turn is engaged and held by the plates 3 and 4. When hydraulic fluid under pressure is admitted through conduit 30—RB to the ram 31—R, the plunger 31—P is caused to travel out of the ram 31—R, thereby increasing the distance between pins 31—B and 31—U, with the result that frame member 2 is caused to rise from its lowest position to its uppermost position, thereby elevating all parts of the apparatus that are associated with the frame member 2. Exit of the hydraulic fluid from ram 31—R reverses the foregoing operation and lowers the frame member 2 with all associated parts of the apparatus. Hydraulic fluid under pressure is provided by the pump 25 and regulated by the valve 27, which may also operate to return exit fluid from the rams 31—R and 31—L to the sump of pump 25.

In Figure 5 I also show the retaining plate 18—R having the vertically slotted holes 18—S engaging bolts 18—B in plate 3, whereby the elevation of plate 18—R may be adjusted with relation to plate 4, and with relation to the top 1—T of side forms 1.

In Figures 6 and 7 I show the relative positions of the tubes 16—L, 17—L, 16—R and 17—R with respect to the reciprocating screed 22. The screed 22 has at each end, over the side forms 1, the forwardly projecting box-like ends 22—B. I have shown the screed 22 in full lines when it has traveled to its extreme left stroke in the direction of the arrow 32—L, and in dotted lines its position when it has traveled to its extreme right stroke in the direction of the arrow 32—R. The inwardly and rearwardly sloping front face 33 does not interfere with the end 16—E of tube 16—R, but I have found it necessary to shorten tube 17—R so that its end 17—E is to the left, in the direction of the arrow 32—L, of the end 16—E of tube 16—R. The object of the part, face 33, is to prevent road material from passing over the side forms 1 and being wasted. I have found that by installing the flexible diaphragm 34 attached at 34—F to the rearward edge of plate 18—R, and allowing its rearward edge 34—R to remain free, the rearward edge 34—R will move back and forth continuing in contact with face 33 as the screed 22 reciprocates, as indicated by the dotted lines 34—ED, thereby preventing road material from wasting over the forms 1 behind plate 18—R and face plate 33. The rearward edge 34—R is left free from face plate 33 to permit differential vertical movement of the plate 18—R and face plate 33. One of these differential positions is shown in Figure 8, with plate 18—R elevated to position 18—RU, and carrying with it diaphragm 34.

In Figure 9 I show a vertical cross section taken on line 9—9 of Figure 7. Within the vibrator housing 19 I provide the rotatable shaft 35 on which is mounted the out-of-balance weight 36, which is actuated by the flexible shaft 20 of Figure 7. Around the housing 19 I provide the yoke 36 having the horizontally extending bolting ears 37. Ears 37 are attached by bolts 38 to lugs 39 which are welded to tubes 16—R and 17—R respectively. As the weight 36 is rotated, it imparts oscillations about shaft 35 to the housing 19, and thence through yoke 37, bolts 38 and lugs 39 to the vibrator tubes 16—R and 17—R. These oscillations enable the tubes 16—R and 17—R to impart vibrations in the directions of the radiating arrows 40 to any material in which the tubes 16—R and 17—R may be immersed. A similar apparatus is associated with tubes 16—L and 17—L.

In Figures 10, 11 and 12 I show the devices for eliminating the transmission of vibrations from the tubes 16—R and 17—R to the main frame 2. In this arrangement I have utilized some of the disclosures of my United States Letters Patent No. 2,018,294 issued October 22, 1935. On the lower end of the pusher hanger 15 I attach the upstanding leg 41 having the lower flange 42 to the lower face of which I attach the fabric and rubber power belt or other suitable material 43 extending horizontally in both directions from the flange 42 and approximately parallel to the axes of tubes 16—R and 17—R. On both sides of and appropriately equi-distant from the flange 42 I provide the clamping plates 44 engaging the extended ends of the belt 43. At both ends of plates 44 adjacent to tubes 16—R and 17—R, I attach the vertical tubes 45 within which I insert the spool-shaped rubber or other suitable elastic material sleeves 46, through which I insert the pins 47 which in turn engage the horizontally extending ears 48 welded to tubes 16—R and 17—R. Ears 48 clamp against sleeves 46 and prevent excessive movement of the plates 44 relative to the tubes 16—R and 17—R but permit at the same time, vibrations of the tubes 16—R and 17—R and their pins 47 to take place without excessively vibrating the plates 44, due to the absorption of some of the vibrations by the sleeves 46.

Such vibrations as may occur in plates 44 are mostly absorbed by the free end portions of the belt 43 between its attachment to plates 44 and flange 42. The ends of the belt 43 between plates 44 and flange 42 have freedom of motion in all directions with respect to the amplitude necessary to eliminate the transmission of destructive vibrations, to pusher hanger 15, but at the same time belt 43 is sufficiently rigid in the directions of the arrows 31 to perform its function of propelling the tubes 16—R and 17—R in the direction of the arrows 31 through the roadway material being treated.

To the tubes 16—R and 17—R I weld the upwardly extending spaced lugs 49 in the upper ends of which I place the pins 50 on which I mount the sleeves 46 enclosed in the hollow ends 51 of the connecting rods 52 (Fig. 12). On the threaded connecting rods 52 I provide the nuts 53 bearing against the bottom of the spacer 54, the upper end of which engages the cup 55 of the vibration dampener 56, with the nut 57 also engaging cup 55. The bolting or base flange 58 of dampener 56 is attached to shelf 59 which is a part of upstanding leg 41, the shelf 59 having the slot 60 to permit the passage of lower end 61 of pusher hanger 15. The function of connecting rods 52 is to determine the elevations of tubes 16—R and 17—R relative to flange 42 and upstanding leg 41. The function of shelf 59 and dampeners 56 is to dampen the transmission of vibrations from tubes 16—R and 17—R to main frame 2, and at the same time to permit angular deflections of rods 52 relative both to lugs 49 and dampeners 56.

To provide for rapid adjustment of the elevations of the ends 16—LI and 16—LO of tubes 16—R and 17—R, I provide in the upstanding leg 41 the slotted holes 62 carrying the bolts 63 by means of which leg 41 is attached to lower end 61 of pusher hanger 15. To expedite further the vertical adjustment just referred to, I provide the struts 64 attached to shelf 59 and extending upwardly therefrom, terminating in the racks 65 which in turn engage the pinions 66 which are mounted on opposite sides of the frame 2 on the horizontal shaft 67. Devices for maintaining engagement of racks 65 with pinions 66 are omitted for the sake of clarity. At any selected elevation of the racks 65, the pinions 66 are locked against revolving by the latch 68 engaging the teeth of pinions 66. The shaft 67 is provided with the crank handle 69 by means of which the shaft 67 may be rapidly revolved and the elevations of the tubes 16—R and 17—R quickly adjusted, for instance from a roadway surface having a crown or upward curvature between side forms 1 to a surface which is a tangent between the tops of side forms 1.

Tubes 16—L and 17—L are equipped in a manner similar to the equipment described for tubes 16—R and 17—R.

At suitable locations between pairs of tubes 16—R and 17—R I may provide the spacer bars 70 having the inclined portions 71. I have shown one such bar in Figure 11 with its inclination such that the flat face 71 is presented downwardly toward the lower edge of the side form 1. Since the tubes 16—R and 17—R have vibrations in vertical directions as shown in Figure 9, these directions of vibrations will induce vectors in the directions of the arrows 72 and serve to impart suitable vibrations to the road material 73 and compact and solidify the material 73 against the whole vertical face 74 of side form 1. Similarly, at the ends 16—LI of tubes 16—L, 17—L, 16—R and 17—R in Figure 1, properly disposed spacer bars 70 will serve to compact the road material 73 against a longitudinal center joint structure if the same be built into the roadway slab between the ends 16—LI.

In Figure 13 I show the at-rest positions of tubes 16—R and 17—R in broken lines. When the vibrator mechanism 19 is actuated, the tubes 16—R and 17—R are caused to travel in orbital paths like that assumed by a skipping rope in the hands of a child. The tubes 16—R and 17—R, at one period of their distortion, assume the positions 16—RD and 17—RD shown in solid lines. If the struts 44—A are rigidly welded or attached at ends 44—B to the tubes 16—R and 17—R, then such connections are quickly destroyed and broken. But if the arrangement shown in Figures 10, 11 and 12 is used, permitting the tubes 16—R and 17—R to assume any distorted direction, then no failures take place. I have found that the clamping arrangement shown in Figure 9 holds the tubes 16—R and 17—R in proper colinear relationship.

In Figure 14 I show a method of arranging the tubes 16—R and 17—R, being an invention which is an important improvement on methods heretofore utilized in the vibratory placement and treatment of materials the particles of which move relatively to each other when vibrated.

To illustrate this feature of my present invention I have taken a material such as concrete, consisting of large fragments of coarse aggregate 75 in the void spaces of which is a binding element such as mortar 76 consisting of fine aggregate, cement and water. This material having been deposited upon the supporting medium 77, and laterally confined between side forms 1, the vibrating tubes 16—R and 17—R are propelled through the concrete 73 in the direction of the arrow 31. The lower surface 78 of the tube 16—R may be considerably below the elevation 1—T of the tops of the forms 1. Fragments of coarse aggregate lying first in the position 75—A will rise and flow over the tube 16—R as at 75—B and lodge finally behind tube 16—R in the position 75—C, with the upper portion of the fragment 75—C above the elevation 1—T and the lower portion below said elevation. If the screed 22 having the nose 22—N be propelled in the direction of arrow 31 until nose 22—N makes contact with fragment 75—C, then the concrete or mortar surrounding fragment 75—C will be ripped, torn and grooved as the fragment 75—C is moved from its last position. The same situation exists when the lower surface 79 of tube 17—R is below the elevation 1—T. I have found that by elevating tube 17—R so that the surface 79 is at or somewhat above the elevation 1—T, the fragment 75—D is moved downward until its upper extremity is at or below the elevation 1—T, and I have also found that other fragments formerly occupying the positions 75—E flow over the tube 17—R and finally lodge in the position 75—F, with their lowest extremity above the elevation 1—T. These conditions, I have found, are common to all the fragments of coarse aggregate which may lodge at or near the elevation 1—T, and by propelling the tube 17—R with its lower surface 79 at or above the elevation 1—T, I leave a zone 80 at and above elevation 1—T and between the tube 17—R and the nose 22—N entirely free from intersecting fragments of large aggregate, so that when the nose 22—N progresses along zone 80 and planes the concrete 73 off to desired surface elevation at 1—T, no irregularities exist in the surface behind the screed 22 such as always exist if the tube 17—R be not at the elevation just described.

In Figure 15 I show another arrangement of my apparatus in which the vibrating tube 17—R is provided with the trailing portion 17—A having the approximately horizontal surface 79—A tangent to lower tube surface 79, and returning upwardly at 79—B in the surface 79—C which is tangent to the upper surface 79—D of the tube 17—R. That portion of material 73 above line 1—T passing over tube 17—R flows over location 79—D and gradually downward on surface 79—C to leave the zone 80 as described under Figure 14. Surface 79—A also serves to impart additional downward vibratory energy to the material being treated, further to compact and densify the same.

In Figure 16 I show another arrangement of my apparatus, in which I provide the forward main frame 2—A propelling the vibrating tubes 16—R1 and 17—R1, followed by the second main frame 2—B propelling the vibrating tubes 16—R2 and 17—R2, the latter pair if desired being arranged as shown in Figure 14. Following the second frame 2—B I show the screed 22, which may or may not be reciprocated, and which may or may not be provided with the vibrator mechanisms 19—S mounted thereon to vibrate the same, all the above described being propelled in the direction of the arrow 31. Such an arrangement of my apparatus provides for a plurality of locations of vibrating the road material 73, and by varying the relative frequency of vibrations of the respective systems, the advantages set forth in my co-pending application Serial No. 332,273, filed April 29, 1940, now Patent 2,309,033, dated January 19, 1943, will be enjoyed.

It is understood that a greater plurality of systems as shown in Figure 16 may be employed, and that with respect to the system shown in Figures 1 through 4, a greater plurality of tubes may be employed.

In Figure 17 I show another form of my apparatus in which the parallel vibratory tubes 90 are surrounded and carried by the elastic sleeves 91 mounted in the yokes 92. To yokes 92 I attach the elastic members 93 which are in turn attached to the pusher hangers 15 which are shown broken away for the sake of clarity but which may be supported from a carriage frame 2 as in Figures 1 through 4. I also provide the spaced yoke plates 94 and 95 which support the vibrator mechanism 19 in such a manner that the shaft 35 of Figure 9, instead of being parallel to the axes of the tubes 90, is at an angle with the plane passing through the axes of tubes 90. Mechanism 19 is actuated by flexible power shaft 20. The vibrations generated by the mechanism 19 will be generally in planes perpendicular to shaft 35. Some components of the vibrations imparted to tubes 90 will be in the directions of the arrows 96, in planes perpendicular to the long axes of tubes 90.

At spaced intervals on tubes 90 I mount the vibrator plates 97 and 98, extending away from the outer surfaces of members 90, which may be cylindrical or of any other convenient cross-section, or shape. Some of the vibrations of the mechanism 19 will generate vibratory forces in members 90 in the directions of the arrows 99 and 100, and such motions will be imparted to the plates 97 and 98.

When in contact with the material to be treated, the members 90 will impart to the material, vibrations having components in the directions of the arrows 96, as well as in other directions, and the plates 97 and 98 will impart to the material, vibrations in still other directions, for instance in the directions of arrows 99 and 100. Thereby the material will receive vibrations in a series of at least three non-parallel planes, simultaneously. I may also elect to mount the plates 98 in a manner whereby their planes are at an angle to the axes of the members 90, in which case plates 98 will function in the same manner as the bars 71 of Figures 10 and 11.

In Figure 18 I show another form of my apparatus, in which I utilize for purposes of illustration, a carriage 14 generally similar to carriage 14—C of Figures 1 through 4. I provide the screed 22, which may or may not be reciprocated, screed 22 being in front of carriage 14 when the apparatus is propelled in the direction of the arrow 31. Screed 22 may be provided with the vibrator mechanisms 19—S attached thereto and with the nose 22—N, and the front face 22—F, as well as with the rearwardly extending bottom plate 22—H. Screed 22 may also be provided at its ends with the angular front faces 33, and the supplementary faces 22—B.

To propel the screed 22 I mounted upon it the pushers 101 which are propelled by the buffer 102 carried on the carriage 14. To elevate and lower screed 22 I provide the eye-bolts 103 attached to plate 22—H and carrying chains 104 engaging cranks 105 carried by rotatable shafts 106 riding in bearings 107 on the buffer 102. By means not shown I am able to rotate shafts 106 and thereby raise and lower screed 22 at will. I also provide the arm 108 mounted on screed plate 22—H and having its pin 109 engaging connecting rod 110 which in turn engages pin 111 of crank 112 which is mounted on rotatable shaft 113 carried in bearing 114 on buffer 102. I do not show the means by which I rotate shaft 113 but power may be supplied to shaft 113 by any conventional means. As shaft 113 is rotated it rotates crank 112, and through connecting rod 110 causes the screed 22 to be reciprocated in both directions as indicated by the double headed arrow 32.

With the mechanisms 19—S in operation, the screed 22 may be propelled against any material 73 confined generally between side forms 1 and will impart to the material 73 vibrations having components in planes parallel to the arrow 31, thereby compacting and condensing the material 73 and reducing its upper surface to any desired contour.

Forward of screed 22 I provide the pusher plates 3 and 61 which may be associated with a structure conforming to member 2 of Figures 1 through 4, and the associated devices. I provide the vibratory screeds 114 and 115 having the front faces 116, the nose parts 117, the rearwardly extending bottom plates 118, and the vibrator mechanisms 19—S attached thereto. The structure conforming to frame 2 and associated devices of Figures 1 through 4 may be associated with the screeds 114 and 115 and be propelled by the carriage 14. At the lower ends of pusher plates 3 I provide the elastic connections 119 attached thereto and to the adjacent ends of screeds 114 and 115. Connections 119 are attached to plates 3 by proper bolts or other fastenings engaging vertical slots 62a permitting adjacent end of screed 114 or 115 to be either elevated or lowered with reference to top 1—T of side forms 1, and also permitting screeds 114 and 115 to be pitched forwardly or rearwardly with noses 117 higher or lower than edge 120 of plate 118. At the pusher plate 61 at middle of apparatus I provide the hanger plate 41 provided with slotted holes 62 carrying bolts 63 by means of which plate 41 is attached to pusher 61, and permitting adjustments similar to those provided at plates 3. Plate 41 is attached to elastic connections 121 which in turn are attached to adjacent ends of screeds 114 and 115. This device is in some respects similar to the apparatus covered in my United States Letters Patent No. 2,094,910, issued October 5, 1937. With this arrangement it is also possible to make the plates 118 of screeds 114 and 115 conform to the lateral curvature of the desired surface of the material 73, as shown in Figure 19. By proper pitching forwardly or rearwardly of the screeds 114 and 115, the same results may be accomplished as set forth under Figure 14.

Having described several specific embodiments of my invention together with the operation thereof, I desire it to be understood that these forms are selected merely for the purpose of facilitating disclosure of the invention rather than for the purpose of limiting the number of forms which it may assume. It is to be further understood that various modifications, adaptations and alterations may be applied to the specific forms disclosed to meet the requirements of practice without in any manner departing from the spirit and scope of the present invention, except as set forth in the claims appended hereto.

I claim as my invention and desire to secure by Letters Patent of the United States:

1. In apparatus of the kind described, a supporting frame, a pair of elongated spaced vibratory members arranged with their axes approximately parallel with each other, vibrating mechanism attached to and vibrating each member, elevation-determining struts extending from each member to said frame, elastic parts operatively associated with said elevation-determining struts interposed between said members and said frame to permit freedom of vibration in said members and to dampen the transmission of vibrations from said members to said frame, propulsion struts having elastic connections to said members to permit freedom of vibration in said members, a propulsion connection means between said propulsion struts and said frame to propel said last struts and thereby said members, and elastic means interposed between said vibrating members and said propulsion connection means to dampen the transmission of vibrations from said members to said propulsion connection.

2. In apparatus for vibrating a material which becomes plastic when vibrated, a frame, a plurality of members attached to the frame having their long axes approximately parallel with each other and to the desired finished surface of the material, vibrating elements connected with said members vibrating in directions radiating from their long axes, and imparting corresponding vibrations to the material, said members also having vibrations in directions having vectors parallel to their long axes, said members being provided with surfaces at angles with their long axes, said surfaces imparting to the material vibrations parallel to said long axes, a movable attachment between the members and the frame, a motor device connected to the frame and one or more of said members for propelling one or more of said members through the material in directions other than those parallel to said long axes, and an elevating and lowering mechanism attached to said movable attachment for controlling the relative elevations of the members for immersing the members in the material and for withdrawing the members from the material.

3. In an apparatus of the kind described, a carriage, a pair of normally parallel longitudinally elongated vibrators, means for supporting said vibrators on the carriage and for connecting them with each other, said means including an element for damping transmission of vibrations from the vibrator to the carriage, and an element for damping transmission of vibration from one vibrator to the other.

4. In an apparatus of the kind described, a carriage adapted to travel along forms for material for a roadway slab or the like, transverse substantially parallel elongated vibrator members spaced apart fore and aft, and suspended from the carriage to be maintained at predetermined heights during the travel of the carriage, means to prevent substantial oscillation of the vibrator members as a unit about the points of suspension, means for vibrating said members whereby they will provide a thin zone or layer adjacent the desired top surfaces of the slab being formed, substantially free from larger aggregate, and a screed behind the members for planing off the concrete at the level of such desired surface.

ROBERT WILLIAM BAILY.